United States Patent
Sørensen et al.

(10) Patent No.: US 10,119,629 B2
(45) Date of Patent: Nov. 6, 2018

(54) HYDRAULIC VALVE

(71) Applicant: GRUNDFOS HOLDING A/S, Bjerringbro (DK)

(72) Inventors: Søren Emil Sørensen, Ulstrup (DK); Per Hovmand, Randers (DK); Steen Mikkelsen, Bjerringbro (DK); Jens Kjær Milthers, Støvring (DK); Kim Hulegaard Jensen, Rødkærsbro (DK); Jan Carøe Aarestrup, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 120 days.

(21) Appl. No.: 15/066,242

(22) Filed: Mar. 10, 2016

(65) Prior Publication Data
US 2016/0265689 A1   Sep. 15, 2016

(30) Foreign Application Priority Data

Mar. 12, 2015 (EP) .................................... 15158775

(51) Int. Cl.
*F16K 51/00* (2006.01)
*F16K 37/00* (2006.01)
*F16K 27/00* (2006.01)
*F16K 31/02* (2006.01)
*F24D 3/10* (2006.01)

(52) U.S. Cl.
CPC .............. *F16K 51/00* (2013.01); *F16K 27/00* (2013.01); *F16K 31/02* (2013.01); *F16K 37/005* (2013.01); *F24D 3/1066* (2013.01); *F24D 2220/0264* (2013.01)

(58) Field of Classification Search
CPC ........ F16K 37/005; G01K 1/143; G01K 1/16; G01J 5/0037; G01J 5/0265; G01J 5/041; Y10T 137/1963; Y10T 137/1987; Y10T 137/7737
See application file for complete search history.

(56) References Cited

U.S. PATENT DOCUMENTS

2010/0305883 A1* 12/2010 Danzy ..................... F16K 17/04
                                                          702/50
2014/0261780 A1*  9/2014 Thomas ................... E03C 1/057
                                                          137/468

FOREIGN PATENT DOCUMENTS

DE   201 03 992 U1    5/2001
EP     0 679 821 A1  11/1995
EP     1 367 306 A1  12/2003

* cited by examiner

Primary Examiner — Mary McManmon
Assistant Examiner — Nicole Gardner
(74) Attorney, Agent, or Firm — McGlew and Tuttle, P.C.

(57) ABSTRACT

A hydraulic valve includes a valve housing (4) with an inside that defines at least one first flow path (7), and with a valve insert (16) which is arranged in the inside of the valve housing (4). The valve insert (16) includes a movable valve element (14) situated in the first flow path (7). An infrared temperature sensor (46) is arranged on or in the valve housing (4) and is directed onto a surface of the valve insert (16) or a surface of a thermal conductor (48) connected to the valve insert. A hydraulic manifold may be provided with such a hydraulic valve.

20 Claims, 5 Drawing Sheets

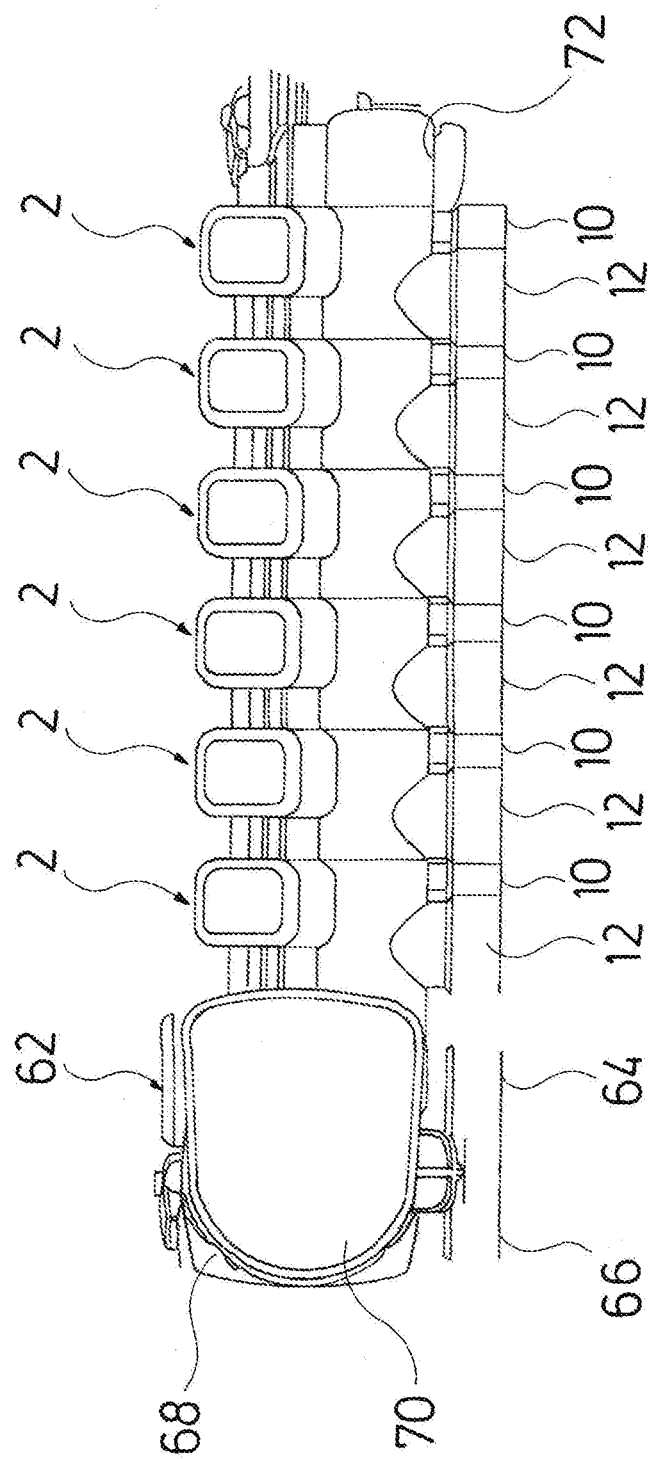

HYDRAULIC VALVE

CROSS REFERENCE TO RELATED APPLICATIONS

This application claims the benefit of priority under 35 U.S.C.§ 119 of European Patent Application 15 158 775.5 filed Mar. 12, 2015, the entire contents of which are incorporated herein by reference.

FIELD OF THE INVENTION

The invention relates to a hydraulic valve, in particular to a hydraulic valve for a heating and/or cooling installation.

BACKGROUND OF THE INVENTION

Hydraulic valves which are used for the closed-loop control of the flow of a fluid heat transfer medium, for example water, in a heating and/or cooling installation, are known. Such valves as a rule comprise a movable valve element which is moved by way of an electric drive. As a rule, the supply or discharge of heat via the load circuits connected to the valves is detected for the closed-loop control of such valves. As a rule, a temperature measurement in the respective load circuit is necessary for this.

SUMMARY OF THE INVENTION

With regard to this problem, it is an object of the invention to provide a hydraulic valve, in which the temperature of the medium flowing through the valve can be detected in a simple manner.

The hydraulic valve according to the invention is preferably provided and adapted for use in a cooling and/or heating installation and serves for the closed-loop control of the flow of a fluid medium, in particular of a heat transfer medium such as water for example. For this, the hydraulic valve comprises a valve housing, in which at least one first flow path is defined, through which the mentioned medium, for example a heat transfer medium can flow. Moreover, a valve insert which has a movable valve element is arranged in the inside of the valve housing. The valve insert can be removably inserted into the valve housing, but also be fixedly connected, e.g. molded, to the valve housing. This valve element is situated in the mentioned first flow path, in order to be able to change the flow cross section of this flow path. The valve element is preferably arranged such that the flow path can likewise be completely closed. The flow through the flow path can be closed-loop controlled by way of the movement of the valve element. Preferably, the valve element for its movement is driven by an electric drive, for example an electromotoric, electromagnetic or electrothermal drive.

An infrared temperature sensor is moreover provided on or in the valve housing for the detection of the temperature. This infrared temperature sensor is directed such that it views onto a surface of the mentioned valve insert or onto a surface of a thermal conductor connected to the valve insert. Thus, the infrared temperature sensor can detect the temperature of this surface on the valve insert or the thermal conductor. Thus, the temperature of this medium can be detected at least approximately in an indirect manner on the surface by the infrared temperature sensor, since the valve insert is thermally conductively connected to the medium flowing through the valve or the valve insert. A thermal conductor which is connected to the valve insert is also thermally conductively connected via the valve insert to the medium flowing through the valve, so that the temperature of the medium which flows through the flow path can at least approximately be detected in an indirect manner on the surface of the thermal conductor, by the infrared temperature sensor. The use of such an infrared temperature sensor has the advantage that one can make do without a direct temperature measurement in the flow path. Thus, it is not necessary to arrange a temperature sensor directly in the flow path, so that no sealing of a temperature sensor with respect to the flow path is necessary. The temperature sensor, which is to say the infrared temperature sensor, in contrast is situated outside the flow path and is thus protected from the medium flowing in the flow path, and in particular from moisture. The infrared temperature sensor can be arranged completely in a dry region of the valve housing.

According to a preferred embodiment, a second flow path which is separate from the first flow path is formed in the valve housing. According to a special embodiment, a second valve insert with a second movable valve element can be situated in such a second flow path. However the second flow path is particularly preferably free of valves and has a constant, unchanging flow cross section. The design of a valve with two flow paths is particularly suitable for the connection of heating or cooling circuits in a heating and/or cooling system. These heating circuits and/or cooling circuits (load circuits) comprise a feed and return. The feed can be connected to the second flow path, whereas the return is connected to the first flow path. Thus, the flow through the return and thus the flow through the complete load circuit is regulated (closed-loop controlled) via the regulation of the flow cross section in the first flow path. The temperature measurement at the first flow path then serves for the detection of the return temperature of the load circuit, which in such installations as a rule is used for detecting the thermal requirement and for regulating the flow. If two such flow paths are provided in the valve housing, then it is preferable for the valve insert which is situated in the first flow path, to be thermally insulated with respect to the second flow path, so that it is only thermally conductively connected to the medium in the first flow path, and the temperature in the first flow path and not the temperature on the second flow path is detected by the infrared temperature sensor in the described manner. It is to be understood that conversely, the first flow path could also serve as the feed, and the second flow path as the return.

The valve housing is preferably manufactured of plastic or of a plastic composite material. Preferably, the valve housing is designed as a single-piece component, for example with injecting molding. This permits an inexpensive manufacture of the valve housing, even if this has a complex shape. With regard to a plastic composite material, it can be the case of a fibre-reinforced plastic for example. As is described below, the material of the valve housing is preferably a material of a low thermal conductively, which is to say acts in a thermally insulating manner. The temperature of the valve insert which is detected by the infrared sensor is prevented from being influenced by a heat feed or heat discharge via the valve housing, on account of this.

Further preferably, at least one section of the valve insert, on which the surface is located, onto which surface the infrared temperature sensor is directed, or the thermal conductor, is manufactured of a material which has a greater thermal conductivity than the material of the valve housing. The valve insert and/or the thermal conductor are preferably manufactured of a highly thermally conductive material, whereas the valve housing is preferably manufactured of a thermally insulating material. It is thus ensured that the temperature on the surface, onto which the infrared temperature sensor is directed, is essentially dependent only on the temperature of the medium which flows through the first flow path and is not affected by a thermal feed and/or discharge via the valve housing.

The valve insert and/or the thermal conductor alternatively and/or additionally can be thermally insulated with respect to the valve housing. This means for example that a thermally insulating material can be arranged between the thermal conductor and the valve housing and/or between the valve insert and the valve housing, for the thermal insulation. Thus, for example, a thermally insulating coating can be provided on the valve housing and/or the valve insert or the thermal conductor. The thermally insulating material for example can be a plastic material with thermally insulating characteristics.

Further preferably, the valve insert at least in a section, on which the surface is situated, onto which surface the infrared temperature sensor is directed, or with which section the thermal conductor is in contact, is manufactured of a metal or a thermally conductive plastic composite material. This means that the valve insert is designed in a thermally conductive manner such that it creates a thermally conductive connection from the medium flowing through the first flow path, to the surface, onto which the infrared temperature sensor is directed. Alternatively, the valve insert creates a thermally conductive connection between the medium and a contact surface to the thermal conductor. The thermal conductor itself is preferably likewise manufactured of a good thermally conductive material, in particular of metal or of a thermally conductive plastic composite material. Such a plastic composite material for example can be a plastic material, to which thermally conductive particles such as metal particles are added. Whereas the valve insert and/or the thermal conductor are preferably manufactured of metal or a plastic with added metal particles, the valve housing is preferably manufactured of a poorly thermally conductive plastic, which is to say a thermally insulating plastic.

That component or that section of the valve insert, on which the surface is situated, onto which surface the infrared temperature sensor is directed, or with which the thermal conductor is in contact, is preferably designed in a manner such that the component or the section, in a region which is distanced to the surface or the thermal conductor, comes into direct contact with a fluid located in a flow path, preferably the first flow path. Thus, a heat transfer from the medium or fluid flowing through the flow path onto the valve insert is ensured, wherein the heat is then led further from the valve insert to the surface, onto which the temperature sensor is directed, or to the thermal conductor. Thus, the temperature of the medium or the fluid can be measured in an indirect and at least approximate manner by the infrared temperature sensor. The valve insert can be connected to the first flow path or, inasmuch as such is present, also to the second flow path, depending on in which of the flow paths the valve insert is arranged. Both valve inserts can also be designed in a corresponding manner, in the case that a corresponding valve insert is arranged in both flow paths, so that the temperatures in both flow paths can be detected with two corresponding infrared temperature sensors.

Further preferably, that component of the valve insert or that section of the valve insert, on which the surface is located, onto which surface the infrared temperature sensor is directed, or with which component or section the thermal conductor is in contact, lies outside a flow path, preferably the first flow path, in a region which is sealed with respect to this flow path. The valve insert thus forms a bridge between the wet region of the valve, in which the fluid or medium, whose temperature is to be detected flows, and a dry region of the valve housing, in which the infrared temperature sensor is situated. The valve insert, in the previously described manner thereby transfers the heat from the fluid or medium to a surface or a thermal conductor, onto which the infrared temperature sensor is directed for the temperature measurement. Thus, it is ensured that the infrared temperature sensor is protected from the medium or the fluid, in particular moisture, by way of the sealing of the region, in which the infrared temperature sensor is situated.

According to a preferred embodiment of the invention, the valve insert comprises a carrier element, in or on which the valve element is movably mounted, wherein the carrier element is preferably manufactured of a metal or of a plastic composite material, in particular a thermally conductive plastic composite material. As described above, such a plastic composite material for example can be a plastic material with embedded, thermally conductive particles, for example metal particles. The carrier element can function as a thermally conductive element between the medium or the fluid, whose temperature is to be determined, and the surface, onto which the infrared temperature sensor is directed, or the thermal conductor, in the case that the carrier element is manufactured in a thermally conductive manner of metal or a plastic composite material. The surface, onto which the infrared temperature sensor is directed, is particularly preferably formed directly on the carrier element, or the thermal conductor is thermally conductively connected or in thermal conductive contact with the carrier element. A thermally conductive medium, such as a thermally conductive paste can yet be incorporated between the thermal conductor and the valve insert or the carrier element, in order to improve the heat transfer, if the thermal conductor is in thermally conductive contact on the valve insert, in particular its carrier element.

The valve insert and in particular a carrier element of the valve insert are preferably inserted into a valve receiver of the valve housing, wherein preferably at least one seal is arranged between the valve insert and the valve housing or between the carrier element and the valve housing. Such a seal for example can be formed by one or more O-rings. The seal thus serves for sealing the flow path or the wet region of the valve housing with respect to the dry region, in which the electrical drive and electrical or electronic components, such as the infrared temperature sensor are situated.

The valve insert can be a component which after the manufacture of the valve housing is inserted into this and is connected to this. Preferably, the valve insert is releasably or removably inserted into the valve housing with such a design, so that it can be exchanged again as the case may be. Alternatively, it is also possible to fixedly connect the valve insert to the valve housing. According to a preferred embodiment of the invention, it is also possible to connect the valve insert to the valve housing with a material fit, in particular to mold the valve insert into the valve housing. If the valve insert is manufactured of metal, then it can be inserted into the tool for example before the injection molding of a valve housing of plastic, so that it is enclosed at least on sections by the plastic of the valve housing. Thus a firm and sealed connection between the valve insert and the valve housing can be created. If the valve insert or its carrier element is likewise manufactured of plastic, it is then possible for example to manufacture the valve insert together with the valve housing with two-component injection molding.

If the valve insert or its carrier element is mounded into the valve housing, then it is moreover simply possible to mold in this valve insert or its carrier element in a manner such that on the one side it comes into contact with the flow path and the fluid located therein, whilst on the other side however the surface, upon which the temperature sensor is directed, can be in a dry region of the valve housing.

The valve element is preferably mounted on a spindle drive or gear drive, wherein the spindle drive or gear drive are preferably situated or fastened in the carrier element. The valve element is moved, in particular linearly moved, via the spindle drive or gear drive. Such a drive in particular can serve for converting a rotating drive movement, such as is provided for example by an electric drive motor, into a linear movement of the valve element.

The valve housing preferably comprises an electronics receiving space, in which the infrared temperature sensor is arranged, preferably on a circuit board. Further electrical and/or electronic components can be arranged in the electronic receiving space, apart from the infrared temperature sensor. In particular, such components can be arranged with the infrared temperature sensor on the same circuit board. The electronics receiving space particularly preferably accommodates electronic components which serve for activating an electric drive for the valve element. A circuit board is preferably arranged in the electronics receiving space and in addition to the infrared temperature sensor carries all further electric and electronic components for the valve, so that a very simple assembly of these electrical and electronic components is possible. Further preferably, the required electrical connections for the electric contact of the valve to an electricity supply and, as the case may be, to an external control device are also formed on the circuit board.

The electronics receiving space is preferably separated from the valve receiver by a wall which further preferably is designed as one piece with the valve housing. Particularly preferably, the wall is completely closed between the valve receiver and the electronics receiving space, so that the wall can prevent a possible penetration of moisture from the valve receiving space into the electronics receiving space. The valve insert is inserted into the valve receiving space. The wall which separates the valve receiving space from the electronics receiving space preferably lies in a region of the valve receiver which is separated from the flow path by way of an inserted and sealed valve insert, which is to say in a dry part of the valve receiver. Thus the wall preferably does not serve for the direct sealing of the electronics receiving space with respect to the flow path.

Further preferably, a window, through which an optical connection from the infrared temperature sensor to the surface of the valve insert is given, is formed in the wall, or the described thermal conductor extends through the wall. Such a window can be designed out of glass or a transparent plastic material for example. A material or element which closes the window is preferably sealingly connected to the remaining parts of the valve housing, in particular with a material fit. Particularly preferably, such a transparent window can be manufactured together with the valve housing by way of injection molding. Thus the material forming the window can be co-molded into the valve housing. Inasmuch as the window is closed by a transparent material, the material is selected such that it is adequately transparent to wavelengths which are to be detected, which is to say in the infrared region. The window can alternatively be designed as an opening. One or more openings, through which the thermal conductor extends, can be provided in the wall, in the case that a thermal conductor extends through the wall.

The thermal conductor thereby can be sealed with respect to the edges of the openings. This however is not absolutely necessary. It would also be possible to mold the thermal conductor into the plastic material of the wall, so that a sealed and material-fit connection between the thermal conductor and the valve housing is given. If the valve insert is molded into the valve receiver or the valve housing on molding the valve housing, as described above, then it is further possible to mold a section of the valve insert having the surface, upon which the temperature sensor is directed, into the wall between the valve receiver and the electronics receiving space, in a manner such that the valve insert extends through this wall, and the surface is situated in the electronics receiving space, whilst the rest of the valve insert is arranged in the valve receiver. Thus a thermally conductive connection through the wall separating the valve receiver and the electronics receiver is created.

Apart from the described hydraulic valve, the subject matter of the invention is a hydraulic manifold for use in a hydraulic heating and/or cooling system which comprises one or more hydraulic valves according to the preceding description. Such a hydraulic manifold is particularly preferably adapted for application in a hydraulic heating and/or cooling system. Such a hydraulic manifold in the heating and/or cooling system can for example serve for connecting several load circuits to a heat source and/or cold source such that the flow of a heat transfer medium, in particular water, through the load circuits can be individually regulated via the valves in the hydraulic manifold. Particularly preferably, such a hydraulic manifold is constructed in a modular manner, by way of a desired number of hydraulic valves being joined together into such a hydraulic manifold. Preferably, the individual valves are thereby thermally insulated to one another, or the valve housings have thermally insulating characteristics, as described above. Alternatively, the valve inserts can also be thermally insulated with respect to the valve housings in the manner described above. It is therefore ensured that the temperature measurement in one of the hydraulic valves is not influenced by temperature changes in another of the hydraulic valves.

Particularly preferably, the hydraulic manifold is designed in a manner such that the hydraulic manifold comprises several of the described hydraulic valves, wherein these are connected to one another in a manner such that at least the first flow paths of the hydraulic valves are connected to one another. If the hydraulic valves in a preferred design are to have two flow paths, then the valves can also be joined together such that the first as well as the second flow paths of the individual valves are connected to one another such that a continuous first flow channel and a continuous second flow channel which extend through all valves are formed. The individual valves can comprise suitable hydraulic connections to the first flow channel and/or to the second flow channel, so that in each case a load circuit can be connected to the valves and this is connected via the valves to the continuous flow channels. If only one flow path is provided in the manifold or the valves, then this in a heating and/or cooling system can serve as a feed or as a return. If two flow paths are provided, then preferably one serves as a feed and one as a return.

The invention is hereinafter described by way of example and by way of the attached figures. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a plan view of the hydraulic manifold with several hydraulic valves according to the invention.

DESCRIPTION OF THE PREFERRED EMBODIMENTS

Figure 1:
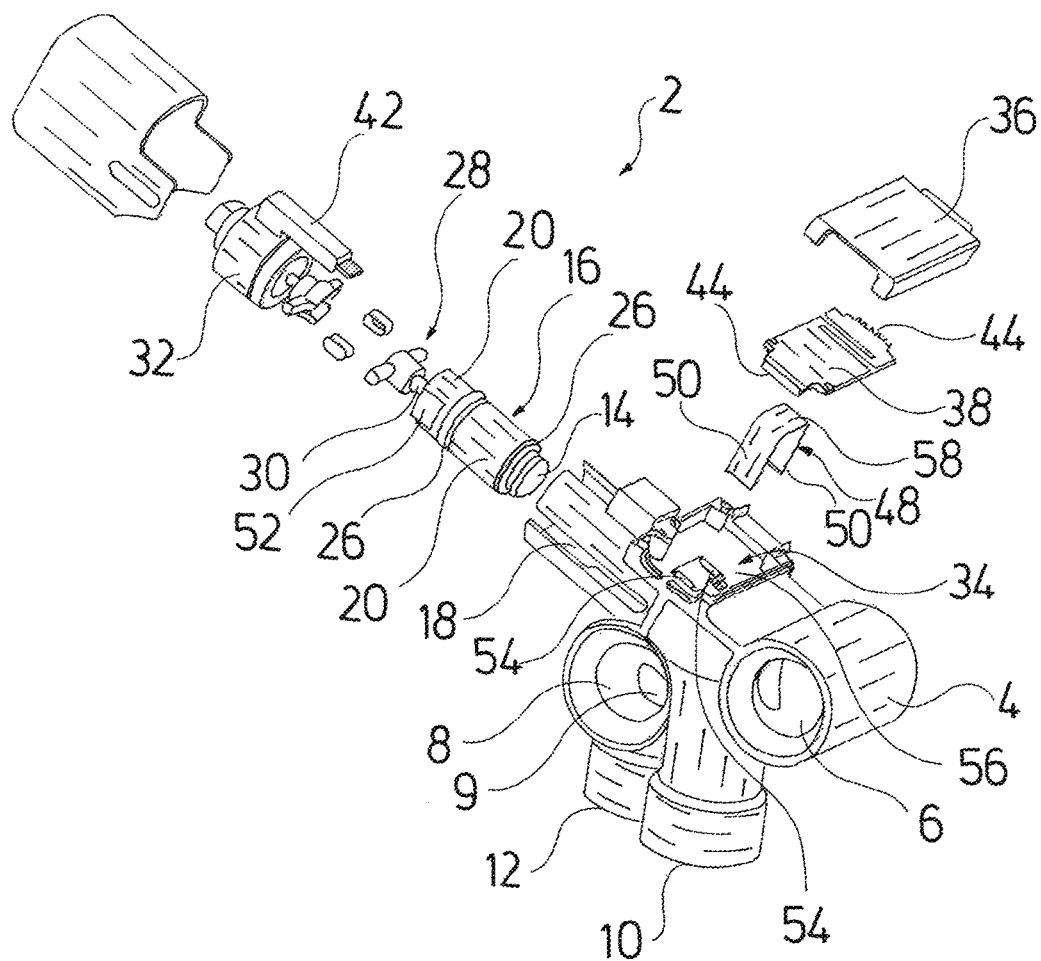
FIG. 1 is an exploded view of a hydraulic valve according to the invention.

Referring to the drawings, the shown hydraulic valve is provided for use in a hydraulic heating and/or cooling installation, in which a fluid heat transfer medium, in particular water is used, in order to transport heat form a heat source, for example a boiler, to an object to be heated, or in the reverse direction, to lead heat away of out of an object to be cooled, to a cooling device. A combined heating and/or cooling installation also is possible. Such a combined installation for example can be used to heat in winter and to cool in summer. The shown hydraulic valve 2 serves for regulating the flow through a load circuit in such a heating and/or cooling system. Thereby, the shown hydraulic valve 2 is designed such that several such valves 2 can be joined together into a hydraulic heating and/or cooling manifold, as is shown in FIG. 5.

Figure 2:
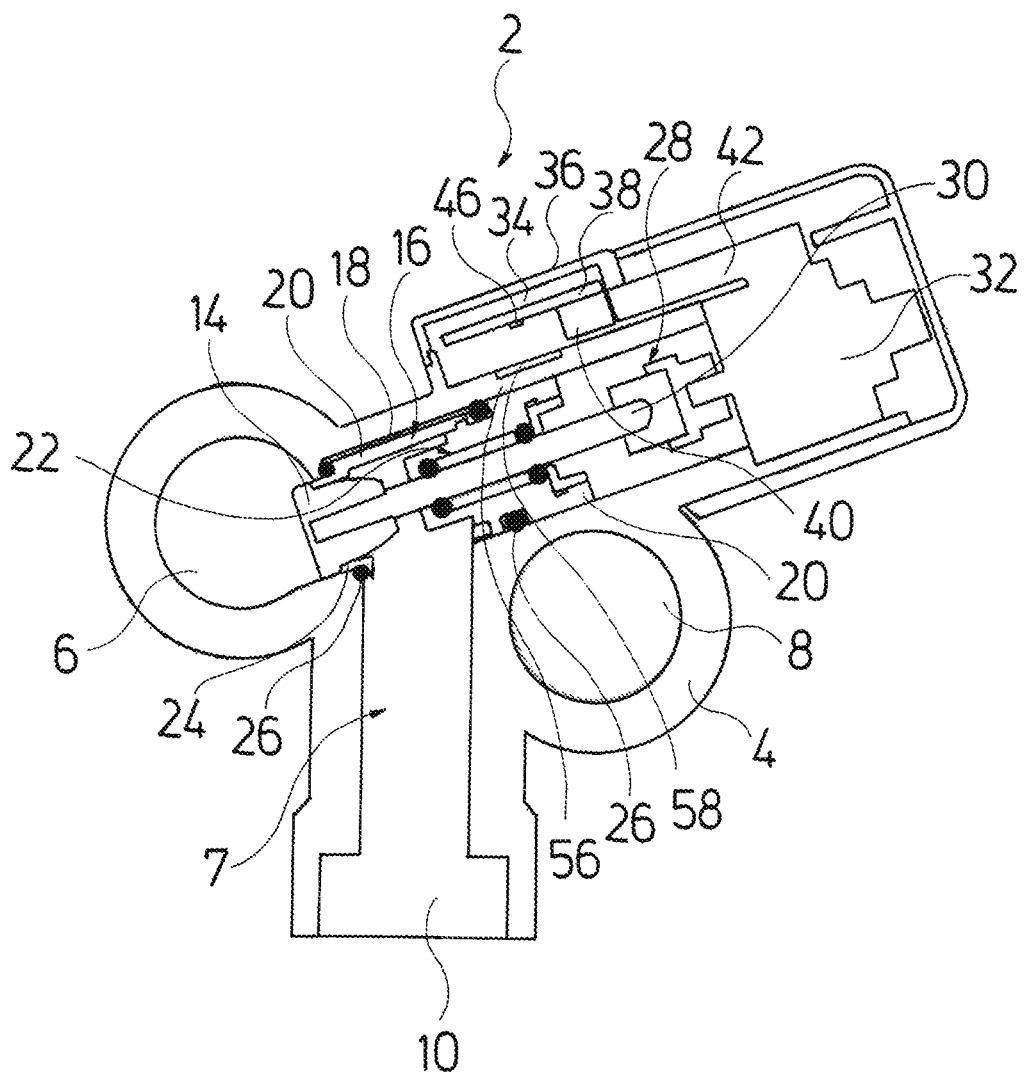
FIG. 2 is a sectioned view of the hydraulic valve according to FIG. 1, in the assembled condition.

FIGS. 1 and 2 show a first embodiment example for such a hydraulic valve 2. The valve as a central constituent comprises a valve housing 4 which can be manufactured for example as an injection molded part of plastic. The valve housing 4 in its inside defines a first flow channel 6 as well as a second flow channel 8. The flow channels 6 and 8 are designed as straight channels which extend next to one another, in this example parallel to one another, from a first to a second opposite end of the valve housing 4. A first hydraulic connection 10 branches from the first flow channel 6, and a second hydraulic connection 12 branches from the second flow channel 8. The connection from the second flow channel 8 to the second hydraulic connection 12 is thereby formed with a fixed, non-changeable cross section, whereas a valve element 14 is situated in the connection from the first flow path 6 to the first hydraulic connection 10. The connection from the first flow channel 6 to the first hydraulic connection 10 forms a first flow path 7, whereas the connection from the second flow channel 8 to the second hydraulic connection 12 forms a second flow path 9. The valve element 14, as is described hereinafter, is movable, in order to closed-loop control the flow cross section through the first flow path 7 to the first hydraulic connection 10 and preferably to close it completely.

The second flow channel and the second flow path 9 preferably form a feed, whereas the first flow channel and the first flow path 7 form a return, if this valve is applied in a heating and/or cooling system. Accordingly, the return of a load circuit is connected to the first hydraulic connection 10, whereas the feed of the load circuit is connected to the second hydraulic connection 12. Thus the cross section in the return from the first hydraulic connection into the first flow channel 6 can be closed-loop controlled by the valve element 14.

The valve element 14 is situated on a valve insert 16, which is inserted into a valve receiver 18 in the valve housing 4. The valve receiver 18 is open to the outside, so that the valve insert 16 can be inserted from the outside into the valve housing 4 and also removed from this, again for example for maintenance purposes. Alternatively, it would be possible to mold the valve insert into the valve receiver of the valve housing, by way of the valve insert being inserted into the injection molding tool before the molding of the valve housing, and the valve housing being molded around the valve insert. A fixed and sealed connection between the valve insert and the valve housing would thus be created.

The valve insert 16 comprises an essentially tubular carrier element 20, in which a spindle drive 22 is mounted as part of the valve insert 16. A valve seat 24, against which the valve element 14 can be sealed and away from which the valve element 14 can be moved linearly, in order to open the flow passage, is formed in the carrier element 20. The valve insert 16 is sealed with respect to the inner wall of the valve receiver 18 by way of two O-rings 26, wherein the first flow path 7 runs through a region between the two O-rings 26. The tubular carrier element 20 in this region comprises an opening, so that a flow passage to the valve seat 24 is formed.

The valve insert 16 at its end which is away from the valve element 14 comprises a coupling 28, via which the spindle 30 is coupled to a drive motor 32.

The valve housing 14 moreover comprises an electronics receiving space 34 which at its upper side is closed by a removable cover 36. A circuit board 38 which carries electric and electronic components for the activation or closed-loop control of the drive motor 32 is arranged in the inside of the electronics receiving space 34, below the cover 36. The circuit board 38 for this is connected via a connection plug 40 to a connection element 42 of the drive motor 32. The circuit board 38 moreover comprises electrical connections 44 for the electrical connection and for data communication with an external control device. Thereby, the electrical connections 44 are preferably designed for connection to the electrical connection 44 of a further valve 2.

An infrared temperature sensor 46 is arranged on the circuit board 38, in order to detect the temperature of the medium flowing through the first flow path 7 from the first hydraulic connection 10 into the first flow path 6. This temperature sensor is directed such that it views or points in the direction of the base of the electronics receiving space 34 and the valve receiver 18 which is situated therebelow. The carrier element 20 of the valve insert 16 is preferably manufactured of metal, for example brass, and is in direct contact with the medium, in particular water, which flows through the first hydraulic connection 10 and the gap between the valve element 14 and the valve seat 24, in the first flow path 7. The temperature of this medium is transferred to the carrier element 20 on account of this. The carrier element 20 in its dry region, which is to say in a region outside the O-rings 26 on a side which is away from the valve element 14, is in contact with a bow-like thermal conductor 48. This thermal conductor 48 is likewise designed from metal, preferably of brass, and bears with its two free limbs 50 on two diametrically opposite contact surfaces 52 on the outer side of the carrier element 20 in a thermally conductive manner. In the example shown here, the carrier element 20 is designed of two parts, but it is to be understood that the carrier element 20 could also be formed in a single-part manner or be formed from more than two parts. Thereby however, preferably all parts of the carrier element 20 are designed in a thermally conductive manner and are connected to one another in a thermally conductive manner, so that the temperature of the medium which flows through the first flow path 7 in the inside of the carrier element 20 is transferred to the contact surfaces 52. The heat is transferred from the contact surfaces 52 onto the limbs 50 of the thermal conductor 48.

The free limbs 50 of the thermal conductor 48 extend through holes 54 in the wall 56 separating the electronics receiving space 34 from the valve receiver 18. The wall 56 forms the base of the electronics receiving space 34. These limbs 50 come into thermally conductive contact on the contact surfaces 52 of the valve insert 16, in the inside of the valve receiver 18, whereas the connection section 58 which connects the limbs 50 to one another into a U-shape comes to lie on the base of the electronics receiving space 34 in its inside, when the thermal conductor 48 is inserted with its limbs 50 into the holes 54. The connection section 58 lies opposite the infrared temperature sensor 46, so that this can detect the temperature on the surface of the connection section 58. Thus the temperature of the medium can be detected indirectly since the connection section 58 via the limbs 50, the contact surfaces 52 and the carrier element 20 is in thermally conductive connection with the medium in the inside of the flow path 7, which is to say in the flow path 7 from the first hydraulic connection 10 to the first flow channel 6. Thereby, the temperature sensor 46 lies outside the wet region of the valve, protected in the inside of the electronics receiving space 34.

Figure 3:
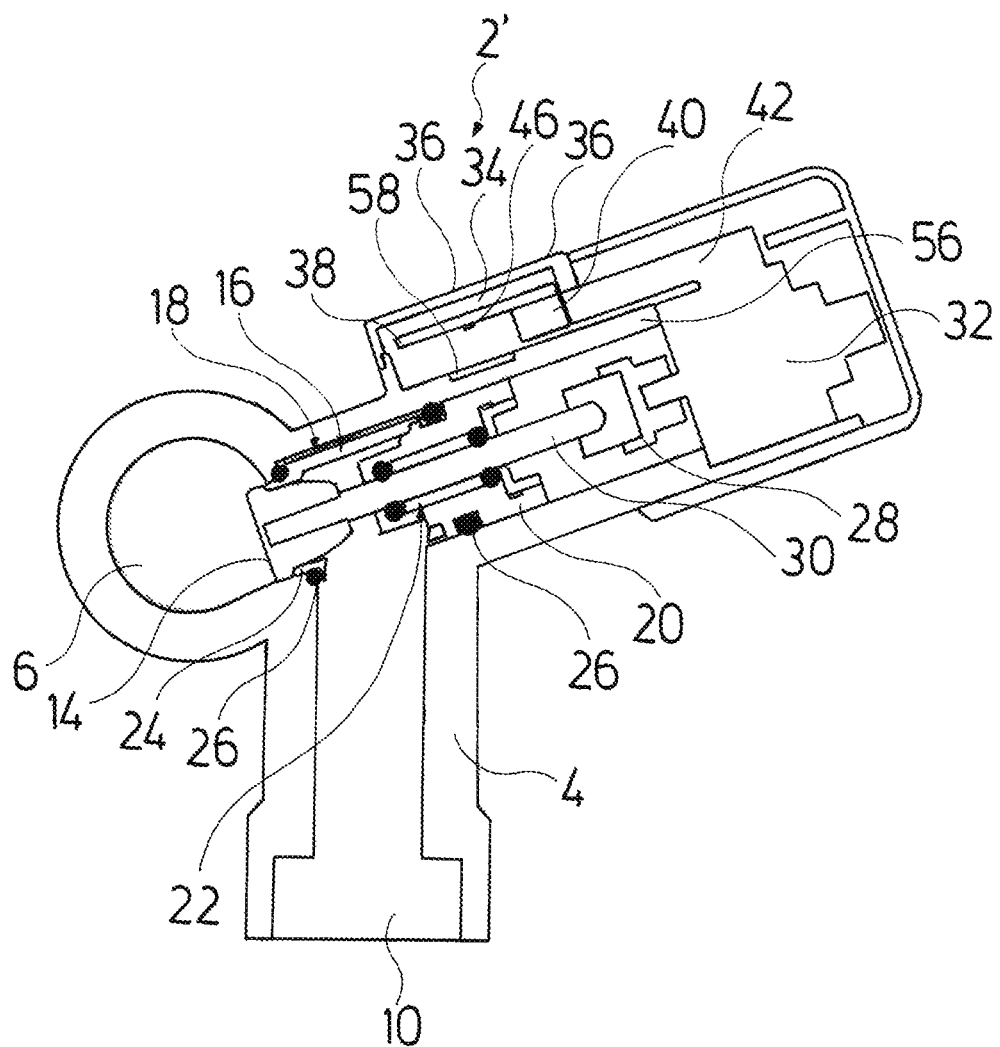
FIG. 3 is a sectioned view of a hydraulic valve according to a second embodiment of the invention.

The embodiment according to FIG. 3 differs from the embodiment described by way of FIGS. 1 and 2 by way of the second flow channel 8 and the associated second hydraulic connection 12 being done away with. All other parts are designed in the same manner, to the extent that the previously description is referred to. Such a valve 2' as is shown in FIG. 3 for example lies in the return of a heating or load circuit, whereas the feed can be led separately through a separate manifold.

Figure 4:
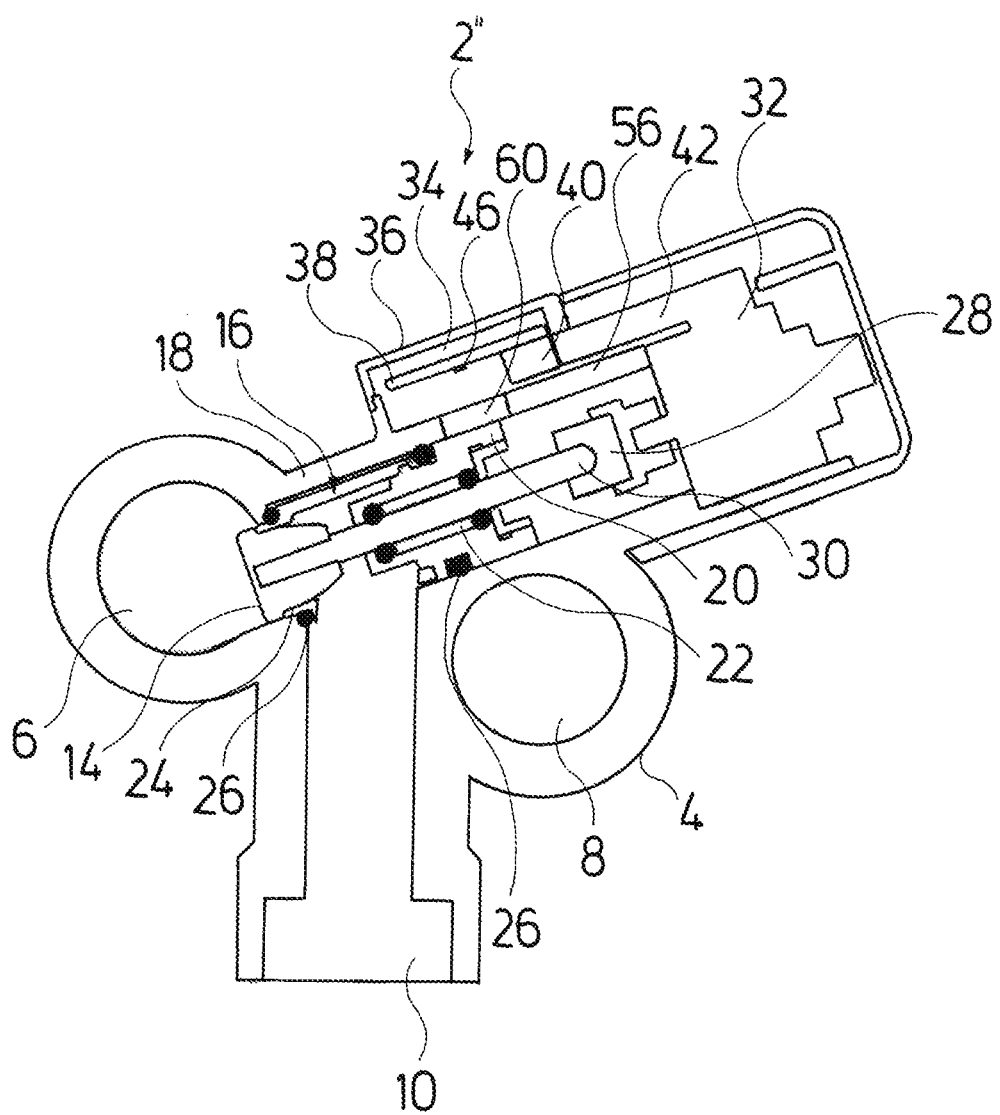
FIG. 4 is a sectioned view of a hydraulic valve according to a third embodiment of the invention.

FIG. 4 shows a third preferred embodiment, with which the shown valve 2" is formed similarly to the valve according to FIGS. 1 and 2. The valve 2" which is shown in FIG. 4 differs from the valve 2 shows in FIGS. 1 and 2 due to the fact that no thermal conductor 48 is used and that a window 60 is formed in the wall 56 instead of the holes 54, through which window the infrared temperature sensor 46 views directly onto the outer side of the carrier element 20 or the valve insert 16. The window 60 can be designed as an opening in the wall 56, but can also be sealingly closed with a transparent material, for example glass or a transparent plastic, wherein the material of the window 60 is then transparent to the wavelengths, in particular infrared radiation, which are to be detected. With such a closed window 60, it is possible to design the electronics receiving space 34 in a completely closed manner with respect to the valve receiver 18, so that the penetration of moisture can be prevented. The description with regard to FIGS. 1 and 2 is referred to with regard to the remaining components and functions. The carrier element 20 could also be shaped such that it can extend through the wall 56, instead of the design of the window 60. Such a carrier element for example could be molded directly into the wall 56.

Common to all three shown embodiment examples is the fact that the carrier element 20 of the valve insert 16 is designed in a thermally conductive manner of metal, whereas the valve housing 4 is manufactured of poorly thermal conducting, which is to say thermally insulating plastic material, as the case may be from a plastic composite material. It is ensured by way of this that a heat supply and/or heat discharge via the valve housing 4 cannot significantly influence the described temperature measurement, since such a heat feed or discharge via the valve housing 4 is low compared to the thermal conduction via the valve insert 16.

FIG. 5 shows the combination of several valves 2 which rowed onto one another form a hydraulic manifold, for example for a heating and/or cooling installation. The valves 2 are shown here, but it is to be understood that the valves 2' or 2" according to FIGS. 3 and 4 could also be rowed together in a corresponding manner. The valves 2 which are joined or rowed together are identical and rowed together such that their flow channels 6 and flow channels 8 (inasmuch as present) are aligned with one another in each case, so that continuous flow channels are formed by the flow channels 6 and 8. Each valve 2 serves for the connection of a load circuit via its first hydraulic connection 10 and its second hydraulic connection 12. Only one first hydraulic connection 10 and one first flow channel 6 would be provided in the case of the embodiment example according to FIG. 3. A main module 62 is applied onto the first valve 2 and this creates the feed or the discharge to the first and second flow channels 6 and 8 and comprises a feed connection 64 and a return connection 66 for this. A circulation pump assembly 68 which is preferably situated in the flow path from the feed connection 64 to the second flow channel 8 in the valves 2, which forms the feed, is arranged in the main module 62 in this embodiment example. The circulation pump assembly 68 comprises an electronics housing 70, in which a control device is situated for the control of the circulation pump assembly 68 and/or for the control of the individual valves 2. For this, the control electronics are connected to the electrical connections 44 of the circuit boards 38, on which the electronics components for the activation of the drive motor 32 of each valve 2 are situated. A row of valves 2 is terminated by closure module 72, at the end which is away from the main module 62. The closure module 72 in particular closes the flow channels 6 and 8 at the end of the hydraulic manifold.

While specific embodiments of the invention have been shown and described in detail to illustrate the application of the principles of the invention, it will be understood that the invention may be embodied otherwise without departing from such principles.

APPENDIX

List of Reference Numerals 2, 2', 2' valve
4 valve housing
6 first flow channel
7 first flow path
8 second flow channel
9 second flow path
10 first hydraulic connection
12 second hydraulic connection
14 valve element
16 valve insert
18 valve receiver
20 carrier element
22 spindle drive
24 valve seat 26 O-rings
28 coupling
30 spindle
32 drive motor
34 electronics receiving space
36 cover
38 circuit board
40 connection plug
42 connection element
44 electrical connections
46 infrared temperature sensor
48 thermal conductor
50 limb
52 contact surfaces
54 holes
56 wall
58 connection section
60 window
62 main module
64 feed connection
66 return connection
68 circulation pump assembly
70 electronics housing
72 closure module

What is claimed is:

1. A hydraulic valve comprising:
a valve housing with an interior surface defining at least one flow path, wherein the interior surface coincides with a boundary of the at least one flow path;
a valve insert arranged in the inside of the valve housing, the valve insert comprising a movable valve element situated in the flow path; and
an infrared temperature sensor arranged on or in the valve housing, the infrared temperature sensor being directed onto a surface of the valve insert or onto a surface of a thermal conductor connected to the valve insert, wherein one of:
at least a section of the valve insert, on which the surface of the valve insert is located, onto which the infrared temperature sensor is directed, is formed from a material which comprises a greater thermal conductivity than the material of the valve housing; and
the thermal conductor is formed from a material which comprises a greater thermal conductivity than the material of the valve housing.

2. A hydraulic valve according to claim 1, wherein the at least one flow path is a first flow path and a second flow path, which is separate from the first flow path is formed in the valve housing, wherein the valve insert is a separate structure from the valve housing.

3. A hydraulic valve according to claim 1, wherein the valve housing is manufactured of plastic or a plastic-composite material.

4. A hydraulic valve according claim 1, wherein the valve insert or the thermal conductor or both the valve insert and the thermal conductor are thermally insulated with respect to the valve housing.

5. A hydraulic valve according claim 1, wherein the section of the valve insert, on which the surface is situated, onto which the infrared temperature sensor is directed, or with which section the thermal conductor is in contact, is manufactured from metal or a thermally conductive plastic composite material.

6. A hydraulic valve according claim 1, wherein a component of the valve insert which comprises the surface, onto which the infrared temperature sensor is directed, or with which component the thermal conductor is in contact, is configured, in a region distanced to the surface or to the thermal conductor, in direct contact with a fluid located in the flow path.

7. A hydraulic valve according claim 1, wherein a component of the valve insert which has the surface, onto which the infrared temperature sensor is directed or with which component the thermal conductor is in contact, is situated outside a flow path, in a region which is sealed with respect to the flow path.

8. A hydraulic valve according claim 1, wherein the valve insert further comprises a carrier element, in which the valve element is movably mounted, wherein the carrier element is manufactured of metal or a plastic-composite material.

9. A hydraulic valve according to claim 8, wherein the carrier element is inserted into a valve receiver of the valve housing and at least one seal is arranged between the carrier element and the valve housing.

10. A hydraulic valve according claim 8, wherein the valve element is mounted in the carrier element on a spindle drive or gear drive.

11. A hydraulic valve according claim 1, wherein the valve housing comprises an electronics receiving space, in which the infrared temperature sensor is arranged on a circuit board.

12. A hydraulic valve according to claim 11, further comprising an electrical drive which moves the valve element, and electronic components which activate the electrical drive, the electrical drive and the electronic components being arranged in the electronics receiving space.

13. A hydraulic valve according to claim 11, wherein the electronics receiving space is separated from a valve receiver by a wall which is configured as one piece with the valve housing.

14. A hydraulic valve according to claim 12, wherein the electronics receiving space is separated from a valve receiver by a wall which is configured as one piece with the valve housing.

15. A hydraulic valve according to claim 13, wherein a window is formed in the wall, through which window an optical connection from the infrared temperature sensor to the surface of the valve insert is provided, or the thermal conductor extends through the wall.

16. A hydraulic manifold for use in a hydraulic heating system or cooling system or both a hydraulic heating and cooling system with one or more hydraulic valves comprising:
a valve housing with an interior defining at least one flow path, the valve housing comprising a valve housing inner surface defining at least a portion of the at least one flow path, wherein the valve housing inner surface coincides with a boundary of the at least one flow path;
a valve insert arranged in the inside of the valve housing, the valve insert comprising a movable valve element situated in the flow path; and
an infrared temperature sensor arranged on or in the valve housing, the infrared temperature sensor being directed onto a surface of the valve insert or onto a surface of a thermal conductor connected to the valve insert, wherein one of:
at least a section of the valve insert, on which the surface of the valve insert is located, onto which the infrared temperature sensor is directed, is formed from a material which comprises a greater thermal conductivity than the material of the valve housing; and the thermal conductor is formed from a material which comprises a greater thermal conductivity than the material of the valve housing.

17. A hydraulic manifold comprising a plurality of hydraulic valves which are connected to one another in a manner such that at least flow paths of the hydraulic valves are connected to one another, at least one of the valves comprising:
- a valve housing comprising an interior surface defining at least a portion of one of the flow paths, wherein the interior surface coincides with a boundary of the one of the flow paths;
- a valve insert arranged in the inside of the valve housing, the valve insert comprising a movable valve element situated in the flow path; and
- an infrared temperature sensor arranged on or in the valve housing, the infrared temperature sensor being directed onto a surface of the valve insert or onto a surface of a thermal conductor connected to the valve insert, wherein one of:
  - at least a section of the valve insert, on which the surface of the valve insert is located, onto which the infrared temperature sensor is directed, is formed from a material which comprises a greater thermal conductivity than the material of the valve housing; and
  - the thermal conductor is formed from a material which comprises a greater thermal conductivity than the material of the valve housing.

18. A hydraulic manifold according to claim 17, wherein the at least one flow path is a first flow path and a second flow path, which is separate from the first flow path is formed in the valve housing, wherein the valve housing is a separate structure from the valve insert.

19. A hydraulic manifold according to claim 17, wherein the valve housing is manufactured of plastic or a plastic-composite material.

20. A hydraulic valve according to claim 1, wherein the valve insert further comprises a carrier element, the valve element being movably mounted in an interior of the carrier element, the thermal conductor comprising a first conductor portion, a second conductor portion, the first conductor portion being in direct contact with one area of the carrier element, the second conductor portion being in contact with another area of the carrier element, wherein a space is defined between the first conductor portion and the second conductor portion, at least a portion of the carrier element being arranged in the space.

* * * * *